Dec. 8, 1970   H. DRESSLER ET AL   3,546,280
PROCESS FOR THE PREPARATION OF NAPHTHALENE DISULFONIC ACID
Filed May 15, 1967
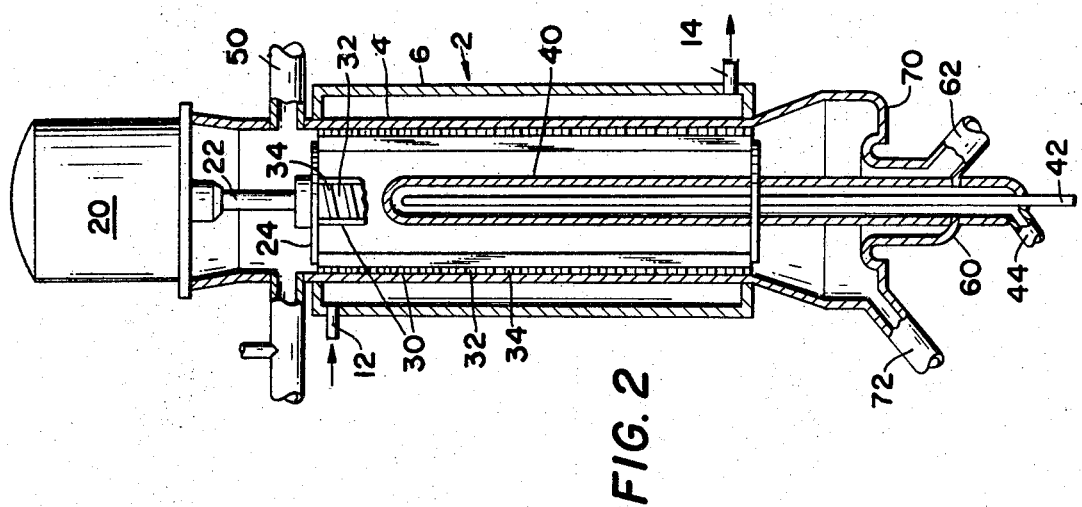
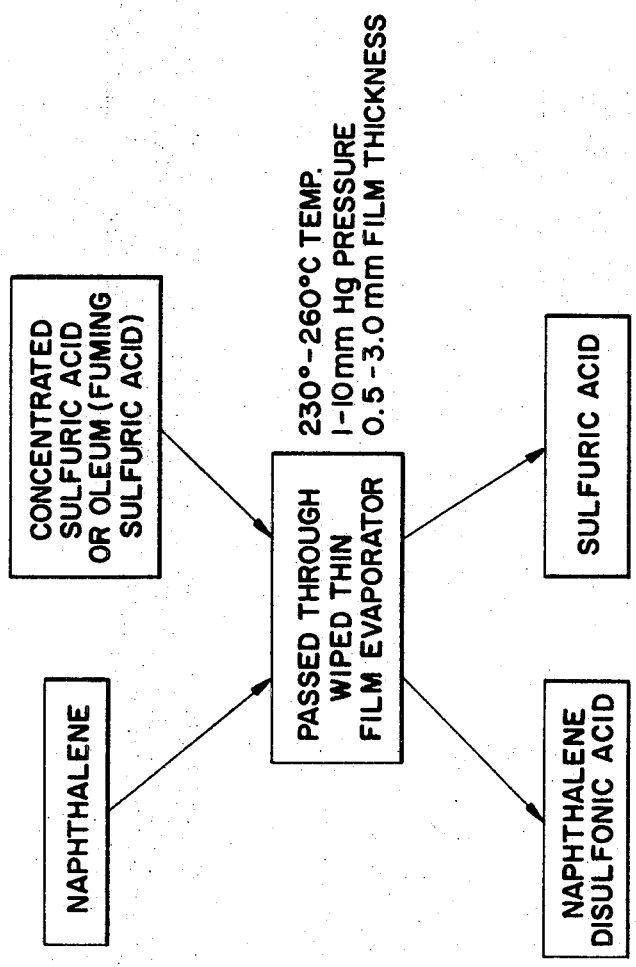
INVENTORS
HANS DRESSLER &
KENNETH G. REABE
BY
John R. Taylor
their Attorney

United States Patent Office

3,546,280
Patented Dec. 8, 1970

3,546,280
PROCESS FOR THE PREPARATION OF
NAPHTHALENE DISULFONIC ACID
Hans Dressler, Pitcairn, and Kenneth G. Reabe, Delmont, Pa., assignors to Koppers Company, Inc., a corporation of Delaware
Filed May 15, 1967, Ser. No. 638,397
Int. Cl. C07c 143/24
U.S. Cl. 260—505     3 Claims

ABSTRACT OF THE DISCLOSURE

Naphthalene disulfonic acid, a useful intermediate for the production of naphthalene diol, is produced by passing a mixture of naphthalene and concentrated sulfuric acid through an evaporation zone as a wiped thin film at a temperature of 220–270° C. and a pressure below 10 mm. Hg. The naphthalene and sulfuric acid react within the evaporation zone to form naphthalene disulfonic acid. The excess sulfuric acid is evaporated from the reaction product and collected in a condensation zone. The resulting naphthalene disulfonic acid is essentially free of sulfuric acid. The recovered sulfuric acid may be recycled for further reaction with fresh naphthalene.

BACKGROUND OF THE INVENTION

Naphthalene disulfonic acids are useful intermediates for the production of naphthalene diols which are used in forming condensation polymers. Naphthalene sulfonic acids are usually produced by reacting naphthalene with sulfuric acid in concentrations such as oleum (oleum and fuming sulfuric acid are common names for 100% sulfuric acid having sulfur trioxide gas dissolved therein). An excess of sulfuric acid is used to ensure complete disulfonation of the naphthalene. As a result, the conventionally produced naphthalene disulfonic acid end product contains excess sulfuric acid which must be separated therefrom. It is highly desirable to separate the excess sulfuric acid from the naphthalene disulfonic acid by a physical means, such as distillation. This procedure has not been practically successful. When the separation is attempted by distillation, the reaction mass is heated in a still and the volatile matter (sulfuric acid) is driven off to be condensed and the condensate removed. However, the distillation conditions necessary to remove sulfuric acid also result in formation of undesired by-products such as higher sulfonated acids, sulfones and the like. Consequently, it has become the practice to remove the excess sulfuric acid by a chemical means, that is, by neutralizing the reaction mass with lime which forms a precipitate with the sulfuric acid and then filtering this precipitate (calcium sulfates) from the soluble calcium salts of the naphthalene disulfonic acid.

SUMMARY OF THE INVENTION

It has now been discovered that naphthalene disulfonic acid may be produced and simultaneously separated from the sulfuric acid by passing a mixture of naphthalene and sulfuric acid through a wiped thin film evaporator. This discovery was quite surprising in view of unsuccessful attempts to produce the homolog benzene disulfonic acid by passing a mixture of benzene and sulfuric acid through a wiped thin film evaporator. The result in the latter case was a mixture of benzene monosulfonic acids and sulfuric acid itself.

In accordance with the invention, naphthalene disulfonic acid in quantitative yields, essentially free of sulfuric acid, is produced by passing a mixture of naphthalene and concentrated sulfuric acid through an evaporation zone maintained at a temperature of 220–270° C. and a pressure of less than 10 mm. Hg to disulfonate the naphthalene and to separate by evaporation, the excess sulfuric acid from the disulfonated naphthalene product.

In a preferred embodiment, the mixture of naphthalene and concentrated sulfuric acid is preheated to a temperature of at least 120° C. before being passed through the evaporation zone.

DETAILED DESCRIPTION

Sulfonation of naphthalene may result in a mixture of alpha (1,4,5 or 8) and beta (2,3,6 or 7) naphthalene sulfonic acids. While the alpha positions of naphthalene have a higher reactivity, hydrolysis of alpha naphthalene sulfonic acid occurs at temperatures above 70° C., particularly in the presence of mineral acids, and sulfonation becomes an equilibrium reaction. In contrast, hydrolysis of the sulfonic acid groups at the beta positions does not occur below 113° C. in the presence of mineral acids, and even at equivalent conditions of temperature is only $\frac{1}{50}$ as rapid as hydrolysis of the alpha position. Therefore, at temperatures above 70° C. substantially all of the naphthalene monosulfonic acid formed has the sulfonic acid group in a beta position. The further sulfonation of beta naphthalene monosulfonic acid is 5–15 times more rapid than the corresponding sulfonation of alpha naphthalene monosulfonic acid under identical conditions. The sulfonation of naphthalene at temperatures above 120° C., therefore, results in a predominance of the 2,6 and 2,7 isomers of the naphthalene disulfonic acids (both sulfonic acid groups in a beta position). These naphthalene disulfonic acids are valuable as intermediates for the production of naphthalene diols. However, as the result of the high temperature necessary to produce there products, impurities in the form of byproducts such as sulfones may be also be formed. Furthermore, as the sulfonation must be carried out in the presence of an excessive amount of sulfuric acid, and quite often in the presence of oleum or fuming sulfuric acid, it is necessary to remove the sulfuric acid from the reaction product before the product can be further used. As mentioned above, separation by distillation techniques is impractical because of the formation of unwanted byproducts. Chemical separation, while satisfactory, results in added process costs and time delay.

In accordance with the invention, the sulfonation is carried out simultaneously with the separation of the sulfuric acid from the reaction product. The sulfuric acid useable in the process, therefore, may range from 80–100% concentrated sulfuric to the fuming sulfuric or oleum types. Furthermore, the sulfuric acid used may be a fresh supply or may be recycled distillate recovered from the separation within the evaporator.

In the preferred embodiment, the naphthalene is mixed with the concentrated sulfuric or oleum and heated to an intermediate temperature of 100–125° C. over a period of about 10–15 minutes to dissolve the naphthalene and the preheated reactants are then passed through the wiped film evaporator to disulfonate the naphthalene and separate the excess sulfuric acid therefrom.

In accordance with the invention, the mixture is passed through the evaporation zone as a thin film of about 0.5–3.0 mm. at a temperature of 220–270° C. and a pressure below 10 mm. Hg. These conditions are produced utilizing a thin film evaporator wherein the reactants pass down the inner surface of a circular wall which is constantly wiped by circulating blades which are adjusted to maintain a thin film of desired thickness. The temperature of the reactants in the zone is maintained by controlling the temperature of the circular wall such as by surrounding the wall with an outer jacket and passing heated oil or the like through the jacket. A specific apparatus which may be used in the process of the invention will hereinafter be described.

The mixture of naphthalene and concentrated sulfuric or oleum may also be prereacted for a considerable period of time (1–20 hours) at a much lower temperature (15–40° C.) to form naphthalene monosulfonic acid. The reaction mass is then heated to the temperature previously mentioned (100–125° C.) and passed through the evaporator under the same conditions specified above. The monosulfonic acids are disulfonated in the wiped film evaporator and any alpha isomers are simultaneously isomerized to the beta position. The excess sulfuric acid is evaporated within the film evaporator and is condensed and removed separately as distillate as previously described.

The invention will be further understood by referring to the following drawings in which:

FIG. 1 is a flow sheet illustrating the process of the invention.

FIG. 2 is a partially cutaway view of a typical thin film evaporator which may be used to carry out the process shown in FIG. 1.

Referring now to FIG. 2, the thin film evaporator, generally designated at 2 has a cylindrical wall 4 surrounded by a jacket 6 through which steam or hot oil may be passed by means of inlet 12 and outlet 14 to heat cylindrical wall 4.

A gear drive motor 20 is mounted on top of the evaporator to turn rotor 24 through shaft 22. Rotor 24, in turn, carries a series of vertical wipers 30 which contact cylinder wall 4 for substantially its entire length.

A cold finger or condenser 40 is centrally mounted within evaporator 2 adjacent wipers 30 to condense the excess sulfuric acid as it evaporates from the warm cylinder wall 4. Inlet port 42 and outlet port 44 are used to connect the condenser coils to an external cooling source not shown.

The naphthalene-sulfuric acid feed mixture enters evaporator 2 through feed port 50 and is guided by the top portion of rotor 24 toward the periphery of evaporator wall 4. As the liquid travels down wall 4, it is spread into an even film by wipers 30 as they axially rotate within the evaporator wall. As the naphthalene is disulfonated, the excess sulfuric acid evaporates and condenses on condenser 40 from whence it passes down to a collection trough 60 and out distillate exit port 62.

The naphthalene disulfonic acid continues to travel down cylinder wall 4 and finally passes into collection trough 70 and out residue collection port 72.

It should be noted that wiper 30 is formed with grooves or lands 32 spirally cut into the surface of the wipers and separated by ridges 34. The grooves and ridges act to limit the film thickness and to accelerate the passage of the film down the evaporator wall.

The thin, film, therefore, is formed on the wall of the evaporator by the centrifugal forces created by rotation of the rotor and wiper blades. The thickness of the film within relatively narrow limits, may vary somewhat with the physical makeup of the wiper blade. For example, the wiper blade may be rigidly mounted with a fixed clearance or it may be spring loaded or may have grooves cut into the blade as in the design illustrated in FIG. 2. However, in any case, the film thickness should not be less than 0.5 mm., nor greater than 3.0 mm. Forming a film less than 0.5 mm. is difficult and from a practical standpoint is not feasible. Films greater than 3.0 mm. are also undesirable because of uneven temperatures in the film and interference with the rotation of the wiper blades especially as the sulfuric acid evaporates and the viscosity of the residue of the reaction mass increases. It is preferred that the thickness of the film be closely controlled such as by the rigid mounting of the blades or by providing grooves of uniform depth as in FIG. 2. In this manner, the residence time may be more accurately calibrated to the feed rate to produce uniform reaction results under any given set of temperature and pressure conditions within the range specified. It is also important that the feed rate be not excessively increased to a point where the wall becomes flooded because, under such conditions, the incoming liquid feed tends to trap ahead of the wiper as a fillet, and the liquid in the fillet, under the influence of gravity, will fall much faster than the material spread on the cylinder wall, where viscous drag on the wall slows the downward motion. Thus, uneven residence time will result. This may be avoided by adjusting the feed rate downward to prevent such flooding effects.

In accordance with the invention, naphthalene disulfonic acid may be produced by passing a mixture of naphthalene and an excess of concentrated sulfuric acid through a wiped, thin film evaporator. To achieve this, for example a mixture containing 256 grams (2 moles) of naphthalene and 1470 grams (15 moles) of concentrated (97%) sulfuric acid was heated for 15 minutes to a temperature of 125° C. The mixture was then passed into the wiped, thin film evaporator of FIG. 2. The specific evaporator was a Rota-film molecular Still Model 50–2 manufactured by the Arthur F. Smith Company, having a wall area of 325 cm.$^2$. The wiper blades are fixed to provide a film thickness of about .9 mm. The pressure within the evaporator was maintained at 3 mm. Hg and the wall temperature was held at 245° C. The mixture was passed through the evaporator at a rate of 314 grams per hour. The residence time of the reactants within the evaporation zone was computed, based on the feed rate, at 5.6 minutes.

The residue and distillate were collected and analyzed by IR. The residue was found to contain 568 grams (1.96 moles) of naphthalene disulfonic acid, predominantly the 2,6 isomer (98% yield). Essentially no sulfuric acid was found to be in the residue. No unreacted naphthalene nor naphthalene monosulfonic acids were found in either the residue or the distillate.

As a further illustration of the invention, 600 grams (6.2 moles) of 100% sulfuric acid and 256 grams (2 moles) of ground naphthalene were added to a resin kettle over a period of 50 minutes. The temperature within the kettle was maintained at 14–15° C. during the addition. The resultant red slurry was stirred for another half hour at about 15° C. and 600 grams (7 moles) 30% oleum was then added over a period of one hour while maintaining the temperature at 14–24° C. After the addition of the oleum, the temperature of the mixture was slowly raised to 40° C. over a perior of 1½ hours and then held at this temperature overnight. A thick light pink paste was obtained. IR analysis indicated that the paste was a mixture of naphthalene disulfonic acid and excess sulfuric acid. This paste was heated to a temperature of 105° C. and passed into the wiped thin film evaporator of FIG. 2 under the reaction conditions specified above. The residue, which weighted 567 grams (98% yield), was analyzed by IR and found to consist of naphthalene disulfonic acid, predominantly the 2,6 isomer. The IR analysis did not reveal the presence of any naphthalene monosulfonic acid. IR analysis of the sulfuric acid distillate revealed only slight traces of naphthalene monosulfonic acid indicating that the reaction in the evaporation zone resulted in essentially complete disulfonation of all the naphthalene.

Thus, essentially pure naphthalene disulfonic acid, free of sulfuric acid, can be rapidly and continuously produced without formation of unwanted byproducts and without the further steps of neutralization and separation previously employed to remove sulfuric acid from the naphthalene disulfonic acid product. The result is essentially pure, yet economically produced, naphthalene disulfonic acid.

What is claimed is:

1. A process for the production of essentially sulfuric acid-free naphthalene disulfonic acid, from naphthalene and concentrated sulfuric acids which comprises preheating a mixture of naphthalene and excess concentrated sulfuric acid to a temperature of 100–125° C., passing a mixture of naphthalene and concentrated sulfuric acid through an evaporation zone, maintained at a temperature of 200–270° C., and at a pressure of less than 10 mm. Hg, as a thin, wiped film, of 0.5 to 3 mm. thickness, at a feed rate which prevents flooding of the walls of said zone, to disulfonate the naphthalene and separate by evaporation, the excess sulfuric acid from the disulfonated naphthalene.

2. A process for the production of naphthalene disulfonic acid essentially free of sulfuric acid which comprises heating a mixture of naphthalene and excess concentrated sulfuric acid to a temperature of a least 120° C., and passing the heated mixture as a thin, wiped film of 0.5 to 3 mm. thickness through an evaporation zone maintained at a temperature of 220–270° C., and a pressure of less than 10 mm. Hg, at a feed rate which prevents flooding of the walls of said zone to disulfonate the naphthalene and separate by evaporation the excess sulfuric acid from the disulfonated naphthalene.

3. A process for the production of naphthalene disulfonic acid essentially free of sulfuric acid which comprises:
 (a) reacting a mixture of naphthalene and excess concentrated sulfuric acid at a temperature of 15–40° C., for a period of 1–20 hours;
 (b) preheating said mixture of naphthalene concentrated sulfuric acid after the reaction period at a temperature of between 100 and 125° C.; and
 (c) passing the reaction mixture as a thin, wiped of 0.5 to 3 mm. thickness to an evaporation zone maintained at a temperature of 220–270° C., and a pressure of less than 10 mm. Hg, at a feed rate which prevents flooding of the walls of said zone, to produce disulfonated naphthalene and to separate by evaporation the excess sulfuric acid from said disulfonated naphthalene.

References Cited
UNITED STATES PATENTS

| | | | |
|---|---|---|---|
| 3,193,575 | 7/1965 | Nebel et al. | 260—505C |
| 3,239,559 | 3/1966 | McNelis | 260—505 |

BERNARD HEFLIN, Primary Examiner

L. J. DeCRESCENTE, Assistant Examiner

U.S. Cl. X.R.

159—6